United States Patent [19]

Nimerick et al.

[11] 4,439,337

[45] Mar. 27, 1984

[54] COMPOSITION AND METHOD FOR PREVENTING FREEZING TOGETHER OF VARIOUS SURFACES

[75] Inventors: Kenneth H. Nimerick, Tulsa; Claude T. Copeland, Broken Arrow, both of Okla.

[73] Assignee: The Dow Chemical Company, Midland, Mich.

[21] Appl. No.: 323,159

[22] Filed: Nov. 20, 1981

[51] Int. Cl.³ ............................................. C09K 3/18
[52] U.S. Cl. ................................... 252/70; 252/71; 44/6; 106/13; 427/230; 427/239
[58] Field of Search .............. 252/70, 71, 73, 74, 252/75, 76, 78.1, 79; 44/6; 106/13; 427/230, 239

[56] References Cited

U.S. PATENT DOCUMENTS

| | | | |
|---|---|---|---|
| 1,968,195 | 7/1934 | Fleischer | 252/70 |
| 2,116,682 | 5/1938 | Kleinicke | 252/88 |
| 2,238,776 | 4/1941 | Kleinicke et al. | 252/70 |
| 2,436,146 | 2/1948 | Kleinicke | 44/6 |
| 4,117,214 | 9/1978 | Parks et al. | 252/70 |
| 4,163,079 | 7/1979 | Beafore | 252/70 |
| 4,254,166 | 3/1981 | Glanville et al. | 252/70 |
| 4,290,810 | 9/1981 | Montgomery | 106/13 |
| 4,338,359 | 7/1982 | Kestner | 427/230 |

FOREIGN PATENT DOCUMENTS 652200 8/1974 U.S.S.R. .

OTHER PUBLICATIONS

Thickeners, Polymers of Ethylene Oxide, McCutcheon's 1980 Functional Materials p. 192, The Manufacturing Confectioner Publishing Co., Glen Rock, N.J.

*Primary Examiner*—John E. Kittle
*Assistant Examiner*—Hoa Van Le
*Attorney, Agent, or Firm*—Bruce M. Kanuch

[57] ABSTRACT

A surface which is to be contacted with another surface, e.g., a particulate material, in the presence of moisture (water) which is subject to freezing, is coated with a composition containing water and substantially water soluble components comprising (1) a polyhydroxy compound or monoalkyl ether thereof, (2) an organic non-volatile compound having at least one hydrophilic group, (2) being different than (1), optionally a salt which functions to lower the freezing point of water, and a sufficient quantity of an organic polymer which functions to increase the viscosity and tackiness of the composition sufficient to retain the composition on non-horizontal surfaces to freeze proof the same.

18 Claims, No Drawings

COMPOSITION AND METHOD FOR PREVENTING FREEZING TOGETHER OF VARIOUS SURFACES

BACKGROUND OF THE INVENTION

In freezing environments a problem exists in storing and transporting particulate materials, e.g., gravel, coal and the like, in metal containers, e.g., dump trucks, railroad coal cars and the like. Also, metal parts such as railroad switches, scales, etc. tend to freeze up under such conditions. When the moisture on the surface of particulate materials freezes, the ice which is formed acts as a strong adhesive which causes the particulate materials to form a solid and bond to the interior surfaces of such containers and carriers, thus making it difficult to completely clean the surface. Moisture may come in contact with the interior of such containers and carriers through natural sources such as being carried on the particulate materials, melting snow, rain and the like.

It is obvious that particulate materials such as coal, when frozen into a container can cause serious problems in unloading and the like. Many approaches to solving the problem have been suggested. For example, sodium chloride and calcium chloride have been added to moist coal as it is being loaded with some success.

Attempts have been made to coat the inside of the containers and carriers with a hydrocarbon oil, for example, kerosene. This has provided some help in preventing the particulate material from freezing to the interiors. However, it has not met with complete success.

THE PRIOR ART

In U.S. Pat. No. 4,117,214 a method is taught for reducing the strength of frozen water by dissolving in the water prior to freezing a composition containing both a water-soluble polyhydroxy compound or ether thereof, e.g., propylene glycol, and a water-soluble organic nonvolatile compound having a hydrophilic group such as sodium acetate. The compositions can be added to particulate materials such as coal prior to exposure to freezing conditions. In U.S. Pat. No. 4,163,079 a composition similar to that taught in U.S. Pat. No. 4,117,214 is employed to freeze proof conveyor belts.

In U.S. Pat. No. 3,298,804 the freezing together of coal particles is prevented by employing a composition of a hydrocarbon and a given class of surface-active compounds.

U.S. Pat. Nos. 2,116,682 and 2,436,146 teach treating coal with a composition containing water, a gel forming colloid and various inorganic salts. A polyhydric alcohol is included to prevent the salt from degrading the colloid.

Mori, U.S. Pat. No. 2,222,370 teaches a dust settling composition for coal mines which is an emulsion which may contain small quantities of ethylene glycol and oleic acid to give the emulsion greater permanence or stability, but no mention is made of cold weather applications.

Macaluso et al., U.S. Pat. No. 3,794,472, treat coal with an emulsion to prevent freezing of the coal.

Other art relating principally to deicing compositions or freeze depressants, particularly those suited for aircraft deicing applications, include Korman, U.S. Pat. No. 2,101,472, which teaches a gel containing gelatine to which is added as an antifreeze substance, glycerol and/or a glycol; West et al., U.S. Pat. No. 2,373,727, which teaches a composition such as in Korman, but also including a hydrocarbon to provide an emulsion; Fain et al., U.S. Pat. No. 2,716,068, which teaches a composition of a glycol, at least one of potassium thiocyanate, potassium acetate, urea, or certain inorganic salts, and, optionally, sodium nitrite, and Dawtrey et al., U.S. Pat. No. 3,350,314, which teaches a foamable composition of water, an alkylene polyol, and a long chain aliphatic tertiary amine.

Scott, Jr., et al., U.S. Pat. Nos. 3,624,243 and 3,630,913, each relate to chemical deicers containing corrosion inhibitors making them specially suited for use on airport runways.

Finally, Shapiro, U.S. Pat. No. 2,454,886 relates to the prevention of mist and frost on glass and similar sheet material.

SUMMARY OF THE INVENTION

A freeze release agent is provided which contains substantially water soluble components, (1) (2) and (3) comprising (1) a polyhydroxy compound or monoalkyl ether thereof, (2) an organic nonvolatile compound having at least one hydrophilic group, (2) being different than (1), (3) optionally a salt, which functions to lower the freezing point of water and, (4) an organic polymer which functions to increase the viscosity and tackiness of the composition sufficiently to permit the composition to cling to non-horizontal surfaces to freeze proof the same, and (5) water as a carrying fluid.

The composition is applied to the surface which is desirable to freeze proof. Railroad cars employed to carry coal, truck beds, railroad switches, scales and the like can be treated with the composition to freeze proof the same.

By "water-soluble" is meant sufficiently soluble so that a sufficient quantity of said compound may be dissolved in water to noticeably affect the tendency of water to freeze, thereby bonding particles together and/or surfaces to surfaces, or particles to surfaces.

By "freeze proof" it is meant that a surface is treated to prevent the formation of a high strength bond of ice thereto.

DETAILED DESCRIPTION OF THE INVENTION

Component (1) is a water-soluble polyhydroxy compound or monoalkyl ether thereof. A preferred group is the polyhydroxyalkanes. Typical members of this group are ethylene glycol, diethylene glycol, triethylene glycol, propylene glycol, dipropylene glycol, glycerine and sugar. Of these materials, ethylene glycol is preferred. The monoalkyl ethers, such as the monobutyl ether of ethylene glycol, are also useful. Mixtures of these materials such as a mixture of alkylene glycols may also be employed. A preferred mixture is ethylene glycol and 1,2-propylene glycol.

Component (2) is a water-soluble organic nonvolatile compound which functions to terminate ice crystal growth. The compound must be nonvolatile, i.e., have a sufficiently low vapor pressure at the conditions of use, so that substantially none of the compound will vaporize out of the aqueous solution before the water freezes. This compound should have at least one hydrophilic group such as an amine, carboxyl, or carboxylate group. The compound may be polymeric or non-polymeric.

Typical of the latter are fumaric acid, sodium formate, urea, glycolic acid, tetrasodium salt of ethylene diamine tetraacetic acid, sodium acetate and acetic acid. Other amines and carboxylic materials will be known to the skilled worker. Typical of the polymeric materials are polyacrylamide, polyvinyl pyrrolidone, polyethyleneimine, polyacrylates, polyamide copolymers, such as that sold commercially as Arco S-232, and the natural gums, such as guar gum. All of the useful polymers will be of relatively low molecular weight in order to be water-soluble. Moreover, they are used in quantities which do not materially affect the viscosity of the solution as do the thickening agents which are more fully defined hereinafter. Preferably, an acetate and/or formate is employed.

Optionally, the composition may include as Component (3) a salt(s) such as an inorganic halide salt, e.g., NaCl, $MgCl_2$, $CaCl_2$, sodium bromide, calcium bromide and the like to lower the freezing point of water. One or more of such salts can be employed.

Component (4) is a sufficient quantity of at least one thickening agent or viscosity builder which functions to increase the viscosity and tackiness of the composition sufficiently to maintain the composition on non-horizontal, e.g., vertical or slanted surfaces for a sufficient period of time to function adequately as a freeze proofing agent.

Component (5) is water which functions as a carrying medium.

The amount of each of the materials incorporated into the composition and the ratio of the components to each other may be varied within wide limits.

The composition may contain the following constituents, expressed as percent by weight. More than one of each of the constituents may be employed.

Component
1. Polyhydroxy compound and/or monoalkyl ether thereof, about 5.0 percent to about 98.0 percent;
2. Organic nonvolative compound, about 0.1 to about 10.0 percent;
3. Salt, about 0.1 to about 45 percent;
4. Thickener, a sufficient amount to increase the viscosity and tackiness of the composition to retard its flow when placed on a non-horizontal, e.g., vertical surface. Generally, a sufficient quantity is employed to impart a viscosity of about 25 to about 1500 centipoise (preferably about 50 to about 700 centipoise) as measured in a Brookfield LVF model viscometer at 60 rpm and 74° F.; and
5. $H_2O$, about 5.0 to about 75 percent.

A preferred composition comprises, ethylene glycol, about 10.0 to about 25.0 percent; propylene glycol, about 10.0 to 25.0 percent; sodium acetate, about 0.1 to about 5.0 percent; calcium chloride, about 5.0 to about 30.0 percent; water, about 20.0 to about 60.0 percent and a sufficient quantity of a hydroxyethyl cellulose polymer to form a viscous composition having a viscosity of about 50 to about 700 centipoise as measured on a Brookfield LVF viscometer at 60 rpm and 74° F.

Other constituents may be added to the composition to serve functional purposes. Thus, dyes may be added to assist in effective application, bactericides may be added to protect the thickening agent, stabilizers, antioxidants, corrosion inhibitors and the like may be added to serve their functional purpose.

The composition of the present invention can be applied to the surface to be protected, whether it be a railroad switch, railroad car or truck, in any convenient manner, such as by spraying, brushing, dipping or the like. The amount applied depends primarily on economic factors, too much resulting in a waste of composition. Generally, from about 0.003 to 0.01 gallon per square foot of surface (about 120 cc to about 400 cc per square meter) is effective. The composition finds particular usefulness in freeze proofing metal surfaces, e.g., railroad cars, truck beds and the like, which come into contact with moist coal, gravel and the like under freezing conditions.

EXAMPLE 1

A Thacker Seam coal sample [$\frac{3}{8}$ inch (top size) by U.S. Standard Sieve Series No. 28 (bottom size)] was wet with 10 percent by weight of water. The interior surfaces of two steel pipes (2.1 inches inside diameter by 4 inches long) were coated with a composition containing 98.5 percent of a composition containing 32.94 percent ethylene glycol; 32.94 percent propylene glycol; 4.11 percent sodium acetate; 30 percent water, which had been thickened with 1.5 percent of a polyacrylamide polymer, 25 percent hydrolyzed, and having a molecular weight of about 9 $\overline{M}$. One hundred and fifty grams of the moist coal was placed in each steel pipe and compacted by vibrating the pipe on a vibrating table for about 3 to 4 minutes.

The pipe and contents were frozen overnight in a 5° F. environment. The shear force required to break the cylinder of frozen coal loose from the tubing wall was determined on a Baldwin hydraulic press. The shear force was measured to be 55 and 54 pounds for the two samples. Comparatively, two steel pipes left untreated and filled with moist coal as above required shear forces of 580 and 670 pounds to break the coal loose from the wall.

EXAMPLE 2

Five hundred (500) ml of the liquid composition of Example 1 was thickened by mixing therewith 4.5 grams of a hydroxyethyl cellulose thickening agent having a molecular weight of 100,000 instead of the polyacrylamide polymer.

A coal sample as described in Example 1 was frozen in rectangular open containers, the walls of which had previously been coated with the thickened composition. The effort required to extract the frozen coal from these containers was then determined by inverting the container. In this example, the frozen coal sample fell out of the container without the application of any outside force. In contrast, a frozen core in a similar container not having any release agent required a tap with a hammer to remove the frozen coal.

EXAMPLE 3

In this example, a $\frac{3}{8}$ inch steel plate and 2 inch inside diameter by three inch long pieces of pipe were used to determine the effectiveness of various release agents.

In these tests, the release agent being tested was applied to a 24 inch section of the surface of the steel plate, the pipe section was then placed on the plate and filled with 50 grams of moist coal, as described in Example 1, and compacted by hand to firmness. The plate with the pipe sections was placed in a 5° F. freezer overnight. The tensile pull required to break the frozen coal containing pipe from the steel plate was determined with an Ohaus spring scale. The release agents tested and the results are set forth below. The tests were repeated three times after the initial applications of a release agent employing fresh coal for each test but without adding additional release agent to the steel plate.

Release Agent (parts by weight)

A. 14.96 ethylene glycol; 14.96 propylene glycol; 1.87 sodium acetate; 50.51 H2O; 16.4 CaCl2; 0.04, a bactericide identified as BACTERICIDE 40 from NALCO, a minor amount of an Alizarine Cyanone Green G Extra dye and 0.2 part of a hydroxyethyl cellulose thickening agent having a molecular weight of 100,000.

B. Same as A, except 0.25 part of the hydroxyethyl cellulose was employed.

C. Same as A, except 0.3 part of the hydroxyethyl cellulose was employed.

D. Same as A, except 0.4 part of the hydroxyethyl cellulose was employed.

E. 20.19 ethylene glycol; 20.19 propylene glycol; 2.52 sodium acetate; 57.59 H2O; a minor amount of Alizarine Cyanone Green G Extra dye and 0.4 of the polymer described in A.

F. 36.4 of polyglycerine bottoms from the production of glycerine having the following composition: 80 percent by weight of: glycerine 6-11; diglycerine 19-24; triglycerine 8-11; tetraglycerine 6-8; pentaglycerine 5-7; higher glycerine, balance; and 20 percent water; 46.9 H2O, 16.3 CaCl2, and 0.2 part of the polymer described in A.

G. The composition of A, but instead of the hydroxyethyl cellulose polymer, 0.2 part of a polyethylene oxide polymer (polyoxyethylene glycol) sold by Union Carbide having the trade name Polyox WSR-301 characterized as a water-soluble, high molecular weight resin having a molecular weight of about 4,000,000 was employed.

H. Same as G, except 0.4 part of the polymer.

I. Same as G, except 0.6 part of the polymer.

TABLE I

| Release Composition | Yield at 2-5° F. | | |
|---|---|---|---|
| | 1st Pull* (gms) | 2nd Pull* (gms) | 3rd Pull* (gms) |
| A | 200 | 300 | 775 |
| B | 155 | 270 | 860 |
| C | 245 | 600 | 1250 |
| D | 80 | 600 | 1095 |
| E | 320 | 590 | 1255 |
| F | 135 | 755 | 1635 |
| G | 70 | 685 | 1340 |
| H | 85 | 665 | 1345 |
| I | 70 | 685 | 1340 |
| None | 20** | | |

*Average of two pulls
**lbs

EXAMPLE 4

Not only must the release agent be effective in preventing the bonding of moist surfaces together, it must have sufficient adherence (cling ability) to stay on a non-horizontal vertical surface for a sufficient period of time to be useful in field applications. The following test was conducted to demonstrate the clinging ability of release agents of the invention. Compositions A-D and F-I, as defined in Example 3, were employed in the test. First, the viscosity of the composition was determined in a Brookfield LVF at 60 rpm, at 74° F. and at 5° F. A steel coupon was dipped in the composition to be tested and allowed to drain over various time periods. The amount retained on the coupon was converted to gallons per 1500 ft² which is the surface area of a typical rail car employed to transport coal. The amount retained was determined by weighing the coupon prior to dipping and following the drain period. The results of these tests are set forth in the following Table II.

TABLE II

| Test Formulation | Viscosity @ 74° F. (cps) | Viscosity @ 5° F. (cps) | Amount Side Release agent (gals/1500 ft²) | | | |
|---|---|---|---|---|---|---|
| | | | at 5° F. After | | | at 74° F. After 1 mn |
| | | | 1 mn | 1 hr | 7 hrs | |
| A | 111.25 | 785 | 8.3 | 2.2 | 1.4 | 3.6 |
| B | 180.0 | 1500 | 12.3 | 3.7 | 2.1 | 4.3 |
| C | 293.8 | 1835 | 14.6 | 3.2 | 2.5 | 6.2 |
| D | 685 | 3930 | 21.9 | 5.4 | 3.4 | 9.5 |
| F | 230 | 1580 | 14.5 | 3.7 | 2.4 | 6.2 |
| G | 50 | 165 | 5.0 | 1.5 | 0.6 | 2.5 |
| H | 135 | 645 | 6.8 | 1.3 | 0.7 | 3.8 |
| I | 334 | 910 | 8.6 | 2.6 | 1.5 | 5.6 |

What is claimed is:

1. A composition comprising in amounts sufficient to provide a composition which when applied to a surface reduces the tendency of the surface to become frozen to another surface in the presence of moisture under freezing conditions:

at least one of substantially water soluble components (1), (2), (3) comprising (1)about 5.0 to about 95.0 percent a polyhydroxy compound or monoalkyl ether thereof, (2) about 0.1 to about 10.0 percent an organic non-volatile compound having at least one hydrophilic group, (2) being different than (1), (3) optionally about 0.1 to about 45.0 percent a salt which functions to reduce the freezing point of water, (4) an organic polymer which functions to increase the viscosity and tackiness of the composition sufficiently to maintain the composition on a non-horizontal surface for a sufficient period of time to function to reduce the tendency of a surface to become frozen to another surface in the presence of moisture under freezing conditions and (5) about 5.0 to about 75 percent water.

2. The composition of claim 1 wherein sufficient quantity of Component (4) to impart to the composition a viscosity of about 25 to about 1500 centipoise.

3. The composition of claim 1 wherein Component (2) is selected from the group of an acetate or a formate and Component (3) is selected from the group of CaCl2, MgCl2, NaCl, and Component (4) is selected from the group of celluloses, polyethyene oxides or polyacrylamide polymers.

4. The composition of claim 1 comprising ethylene glycol, about 10 to about 25 percent; propylene glycol, about 10 to about 25 percent; sodium acetate, about 0.1 to about 5.0 percent; calcium chloride, about 5.0 to about 30.0 percent; water, about 20 to about 60 percent; and a sufficient quantity of a hydroxyethyl cellulose polymer to provide a composition having a viscosity of about 25 to about 1500 centipoise.

5. The composition of claim 4 wherein a sufficient quantity of the polymer is employed to impart a viscosity of about 50 to about 700 centipoise.

6. The composition of claim 5 wherein the polymer is a polyethylene oxide.

7. The composition of claim 6 wherein the polymer has a molecular weight of about four million.

8. A method of freeze proofing a surface subject to having bonded thereto frozen water which comprises applying to the surface prior to freezing the composition of claim 1 in an amount ranging from about 120 cc to about 400 cc per square meter of said surface.

9. The method of claim 8 wherein the composition of claim 2 is applied to said surface.

10. The method of claim 8 wherein the composition of claim 3 is applied to said surface.

11. The method of claim 8 wherein the composition of claim 4 is applied to said surface.

12. The method of claim 8 wherein the composition of claim 5 is applied to said surface.

13. The method of claim 8 wherein the composition of claim 6 is applied to said surface.

14. The method of claim 8 wherein the composition of claim 7 is applied to said surface.

15. A method of treating a metal surface which is to come in contact with moist particulate coal under freezing conditions which comprises treating said surface with a sufficient amount of the composition of claim 1 to reduce the bonding of frozen coal to said surface.

16. The method of claim 5 wherein from about 120 cc to about 400 cc of said composition is applied per square meter of said surface.

17. The method of claim 6 wherein the composition of claim 8 is applied to said surface.

18. The method of claim 6 wherein the composition of claim 5 is applied to said surface.

* * * * *

UNITED STATES PATENT AND TRADEMARK OFFICE
CERTIFICATE OF CORRECTION

PATENT NO. : 4,439,337

DATED : Mar. 27, 1984

INVENTOR(S) : Nimerick et al.

It is certified that error appears in the above—identified patent and that said Letters Patent is hereby corrected as shown below:

Claim 16, line 14 "claim 5 wherein" should read -- claim 15 wherein --.

Claim 17, line 17 "claim 6 wherein" should read -- claim 16 wherein; line 18, "of claim 8 is" should read -- of claim 6 is --.

Claim 18, line 19, "of claim 6 wherein" should read -- of claim 16 wherein --.

Signed and Sealed this

Twenty-second Day of January 1985

[SEAL]

Attest:

DONALD J. QUIGG

Attesting Officer

Acting Commissioner of Patents and Trademarks